United States Patent
Brown et al.

(10) Patent No.: US 8,924,561 B2
(45) Date of Patent: Dec. 30, 2014

(54) DYNAMICALLY RESIZING A NETWORKED COMPUTING ENVIRONMENT TO PROCESS A WORKLOAD

(75) Inventors: Gene L. Brown, Durham, CT (US); Brendan F. Coffey, Rhineback, NY (US); Christopher J. Dawson, Arlington, VA (US); Clifford V. Harris, Saugerties, NY (US)

(73) Assignee: International Business Machines Corporation, Armonk, NY (US)

( * ) Notice: Subject to any disclaimer, the term of this patent is extended or adjusted under 35 U.S.C. 154(b) by 186 days.

(21) Appl. No.: 13/106,904

(22) Filed: May 13, 2011

(65) Prior Publication Data

US 2012/0290726 A1 Nov. 15, 2012

(51) Int. Cl.
*G06F 15/16* (2006.01)
*G06F 9/50* (2006.01)

(52) U.S. Cl.
CPC .................... *G06F 9/5072* (2013.01)
USPC .............. 709/226; 710/15; 710/18; 710/29; 710/38

(58) Field of Classification Search
CPC ..... G06F 15/16; G06F 9/5083; G06F 9/5072; G06F 9/45558; G06F 2009/45595; G06B 15/00; G06B 19/41865; G06B 2219/31467; G06B 2219/31449; H04W 4/028; H04W 8/186; H04W 4/02; H04L 67/18; H04L 67/306; H04L 67/16; H04L 63/0272; H04L 12/66
USPC ......................................... 709/226
See application file for complete search history.

(56) References Cited

U.S. PATENT DOCUMENTS

| 7,051,188 | B1 * | 5/2006 | Kubala et al. ............... 712/29 |
| 7,363,370 | B2 | 4/2008 | Collazo |
| 8,037,475 | B1 * | 10/2011 | Jackson ................... 718/104 |
| 2005/0071453 | A1 * | 3/2005 | Ellis et al. ................. 709/223 |
| 2008/0080396 | A1 | 4/2008 | Meijer et al. |
| 2009/0088875 | A1 * | 4/2009 | Baier et al. .................. 700/83 |
| 2009/0300210 | A1 | 12/2009 | Ferris |
| 2010/0050172 | A1 | 2/2010 | Ferris |
| 2010/0076856 | A1 | 3/2010 | Mullins |

(Continued)

OTHER PUBLICATIONS

Maitland, J., "Keeping Control Isn't Easy", Chapter 4: Cloud-Based Infrastructure, SearchCloudComputing.com, 13 pages.

(Continued)

*Primary Examiner* — Anthony Mejia
*Assistant Examiner* — Mehulkumar Shah
(74) *Attorney, Agent, or Firm* — William E. Schiesser; Maxine L. Barasch; Keohane & D'Alessandro PLLC

(57) ABSTRACT

Embodiments of the present invention provide an approach for a networked computing environment (e.g., a cloud computing environment) to be dynamic in nature in that it may automatically be resized based on current/predicted workload and current/predicted resource availability. For example, when a workload is received, a data structure (e.g., a mapping) will be created on a computer storage device and populated with data related to a set of current resources of the networked computing environment that are allocated to the workload. It will then be determined whether a mismatch (e.g., a shortfall) exists between the set of current resources and resources required for processing the workload. If so, a set of peripheral resources will be identified to rectify the mismatch. The networked computing environment will then be resized to accommodate the set of peripheral resources, and the workload will be processed using the resized networked computing environment.

19 Claims, 5 Drawing Sheets

(56) References Cited

U.S. PATENT DOCUMENTS

| | | |
|---|---|---|
| 2010/0076933 A1* | 3/2010 | Hamilton et al. ............. 707/640 |
| 2010/0153482 A1 | 6/2010 | Kim et al. |
| 2010/0269119 A1 | 10/2010 | Arimilli et al. |
| 2010/0306379 A1* | 12/2010 | Ferris ............................ 709/226 |
| 2011/0016214 A1 | 1/2011 | Jackson |
| 2011/0022812 A1* | 1/2011 | van der Linden et al. .... 711/163 |
| 2011/0035072 A1* | 2/2011 | Jackson ........................ 700/291 |
| 2011/0151892 A1* | 6/2011 | Vengroff et al. ............ 455/456.3 |
| 2011/0213884 A1* | 9/2011 | Ferris et al. .................... 709/226 |
| 2011/0231899 A1* | 9/2011 | Pulier et al. ...................... 726/1 |
| 2011/0258320 A1* | 10/2011 | Jackson ........................ 709/226 |
| 2012/0096165 A1* | 4/2012 | Madduri et al. .............. 709/226 |
| 2012/0284408 A1* | 11/2012 | Dutta et al. ................... 709/226 |
| 2012/0290726 A1* | 11/2012 | Brown et al. ................. 709/226 |
| 2013/0035114 A1* | 2/2013 | Holden et al. ............. 455/456.3 |

OTHER PUBLICATIONS

Mell et al., "The NIST Definition of Cloud Computing", National Institute of Standards and Technology, Information Technology Laboratory, Version 15, Oct. 7, 2009, 2 pages.

\* cited by examiner

DYNAMICALLY RESIZING A NETWORKED COMPUTING ENVIRONMENT TO PROCESS A WORKLOAD

TECHNICAL FIELD

The present invention relates to workload processing. Specially, the present invention relates to the dynamic resizing of a networked computing environment (e.g., a cloud computing environment).

BACKGROUND

The networked computing environment (e.g., cloud computing environment) is an enhancement to the predecessor grid environment, whereby multiple grids and other computation resources may be further enhanced by one or more additional abstraction layers (e.g., a cloud layer), thus making disparate devices appear to an end-consumer as a single pool of seamless resources. These resources may include such things as physical or logical computing engines, servers and devices, device memory, and storage devices, among others.

One challenge facing cloud computing and/or other networked computing environments is whether sufficient resources exist for processing a workload. For example, a data center may receive a storage workload request, but be at maximum capacity with its current resources. Currently, cloud computing environments may not be readily resized in a dynamic manner. As such, a current cloud computing environment would have to delay processing of the storage workload request and/or shift the storage workload request to another data center or cloud computing environment altogether.

SUMMARY

Embodiments of the present invention provide an approach for a networked computing environment (e.g., a cloud computing environment) to be dynamic in nature in that it may automatically be resized based on current/predicted workload and current/predicted resource availability. For example, when a workload is received, a data structure (e.g., a mapping) will be created on a computer storage device and populated with data related to a set of current resources of the networked computing environment that are allocated to the workload. It will then be determined whether a mismatch (e.g., a shortfall) exists between the set of current resources and resources required for processing the workload. If so, a set of peripheral resources will be identified to rectify the mismatch. The networked computing environment will then be resized to accommodate the set of peripheral resources, and the workload will be processed using the resized networked computing environment.

A first aspect of the present invention provides a computer-implemented method for dynamically resizing a networked computing environment to optimally accommodate a workload, comprising: creating a data structure on a computer storage device and populating the data structure with data related to a set of current resources of the networked computing environment that are allocated to the workload; determining if a mismatch exists between the set of current resources and resources required for processing the workload; responsive to the existence of a mismatch, identifying a set of peripheral resources comprising the mismatch; resizing the networked computing environment based upon the identifying; and processing the workload using the resized networked computing environment.

A second aspect of the present invention provides a system for dynamically resizing a networked computing environment to optimally accommodate a workload, comprising: a bus; a processor coupled to the bus; and a memory medium coupled to the bus, the memory medium comprising instructions to: create a data structure on a computer storage device and populating the data structure with data related to a set of current resources of the networked computing environment that are allocated to the workload; determine if a mismatch exists between the set of current resources and resources required for processing the workload; responsive to the existence of a mismatch, identify a set of peripheral resources comprising the mismatch; resize the networked computing environment based upon the identification of the set of peripheral resources; and process the workload using the resized networked computing environment.

A third aspect of the present invention provides a computer program product for dynamically resizing a networked computing environment to optimally accommodate a workload, comprising: a bus; a processor coupled to the bus; and a memory medium coupled to the bus, the memory medium comprising instructions to: create a data structure on a computer storage device and populating the data structure with data related to a set of current resources of the networked computing environment that are allocated to the workload; determine if a mismatch exists between the set of current resources and resources required for processing the workload; responsive to the existence of a mismatch, identify a set of peripheral resources comprising the mismatch; resize the networked computing environment based upon the identification of the set of peripheral resources; and process the workload using the resized networked computing environment.

A fourth aspect of the present invention provides a method for deploying a system for dynamically resizing a networked computing environment to optimally accommodate a workload, comprising: providing a computer infrastructure being operable to: create a data structure on a computer storage device and populating the data structure with data related to a set of current resources of the networked computing environment that are allocated to the workload; determine if a mismatch exists between the set of current resources and resources required for processing the workload; responsive to the existence of a mismatch, identify a set of peripheral resources comprising the mismatch; resize the networked computing environment based upon the identification of the set of peripheral resources; and process the workload using the resized networked computing environment.

BRIEF DESCRIPTION OF THE DRAWINGS

These and other features of this invention will be more readily understood from the following detailed description of the various aspects of the invention taken in conjunction with the accompanying drawings in which.

Figure 1:
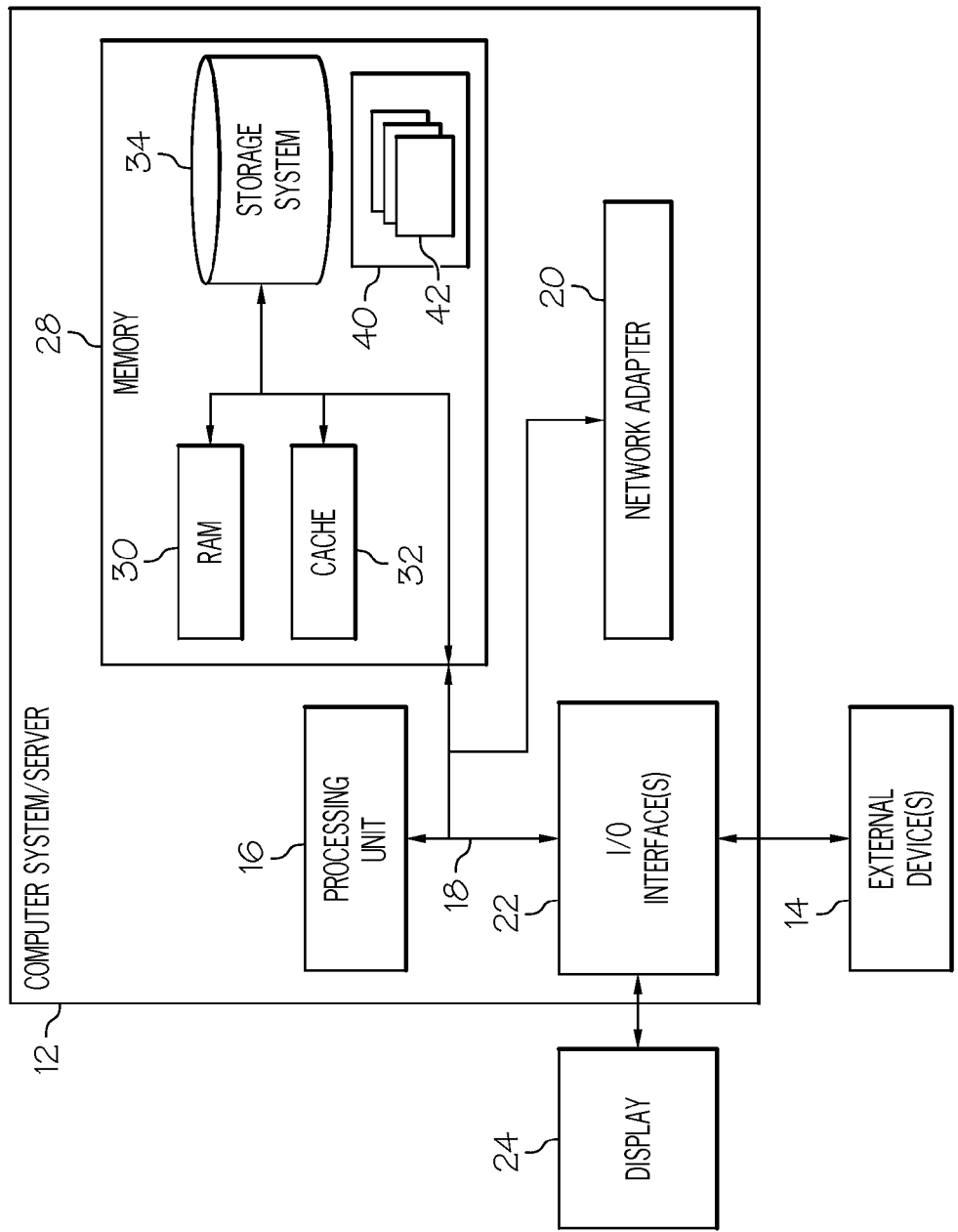
FIG. 1 depicts a cloud computing node according to an embodiment of the present invention.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION

Illustrative embodiments will now be described more fully herein with reference to the accompanying drawings, in which exemplary embodiments are shown. This disclosure may, however, be embodied in many different forms and should not be construed as limited to the exemplary embodiments set forth herein. Rather, these exemplary embodiments are provided so that this disclosure will be thorough and complete and will fully convey the scope of this disclosure to those skilled in the art. In the description, details of well-known features and techniques may be omitted to avoid unnecessarily obscuring the presented embodiments.

The terminology used herein is for the purpose of describing particular embodiments only and is not intended to be limiting of this disclosure. As used herein, the singular forms "a", "an", and "the" are intended to include the plural forms as well, unless the context clearly indicates otherwise. Furthermore, the use of the terms "a", "an", etc., do not denote a limitation of quantity, but rather denote the presence of at least one of the referenced items. It will be further understood that the terms "comprises" and/or "comprising", or rectify "includes" and/or "including", when used in this specification, specify the presence of stated features, regions, integers, steps, operations, elements, and/or components, but do not preclude the presence or addition of one or more other features, regions, integers, steps, operations, elements, components, and/or groups thereof.

Embodiments of the present invention provide an approach for a networked computing environment (e.g., a cloud computing environment) to be dynamic in nature in that it may automatically be resized based on current/predicted workload and current/predicted resource availability. For example, when a workload is received, a data structure (e.g., a mapping) will be created on a computer storage device and populated with data related to a set of current resources of the networked computing environment that are allocated to the workload. It will then be determined whether a mismatch (e.g., a shortfall) exists between the set of current resources and resources required for processing the workload. If so, a set of peripheral resources will be identified to rectify the mismatch. The networked computing environment will then be resized to accommodate the set of peripheral resources, and the workload will be processed using the resized networked computing environment.

It is understood in advance that although this disclosure includes a detailed description of cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed, automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active consumer accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited consumer-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application-hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10, there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM, or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

The embodiments of the invention may be implemented as a computer readable signal medium, which may include a propagated data signal with computer readable program code embodied therein (e.g., in baseband or as part of a carrier wave). Such a propagated signal may take any of a variety of forms including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium including, but not limited to, wireless, wireline, optical fiber cable, radio-frequency (RF), etc., or any suitable combination of the foregoing.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a consumer to interact with computer system/server 12; and/or any devices (e.g., network card, modem, etc.) that enable computer system/server 12 to communicate with one or more other computing devices. Such communication can occur via I/O interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

Figure 2:
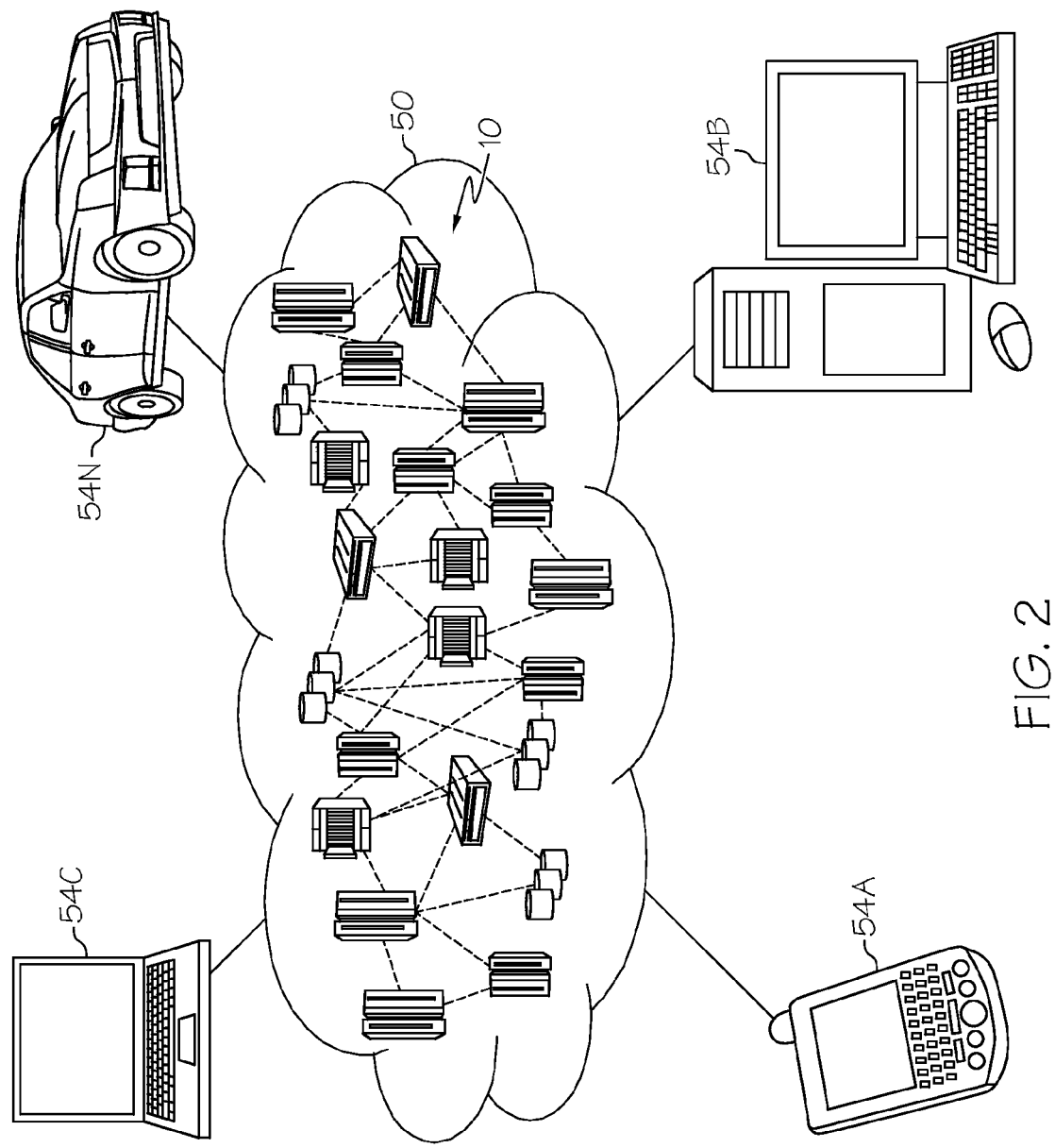
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as private, community, public, or hybrid clouds as described hereinabove, or a combination thereof. This allows cloud computing environment 50 to offer infrastructure, platforms, and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
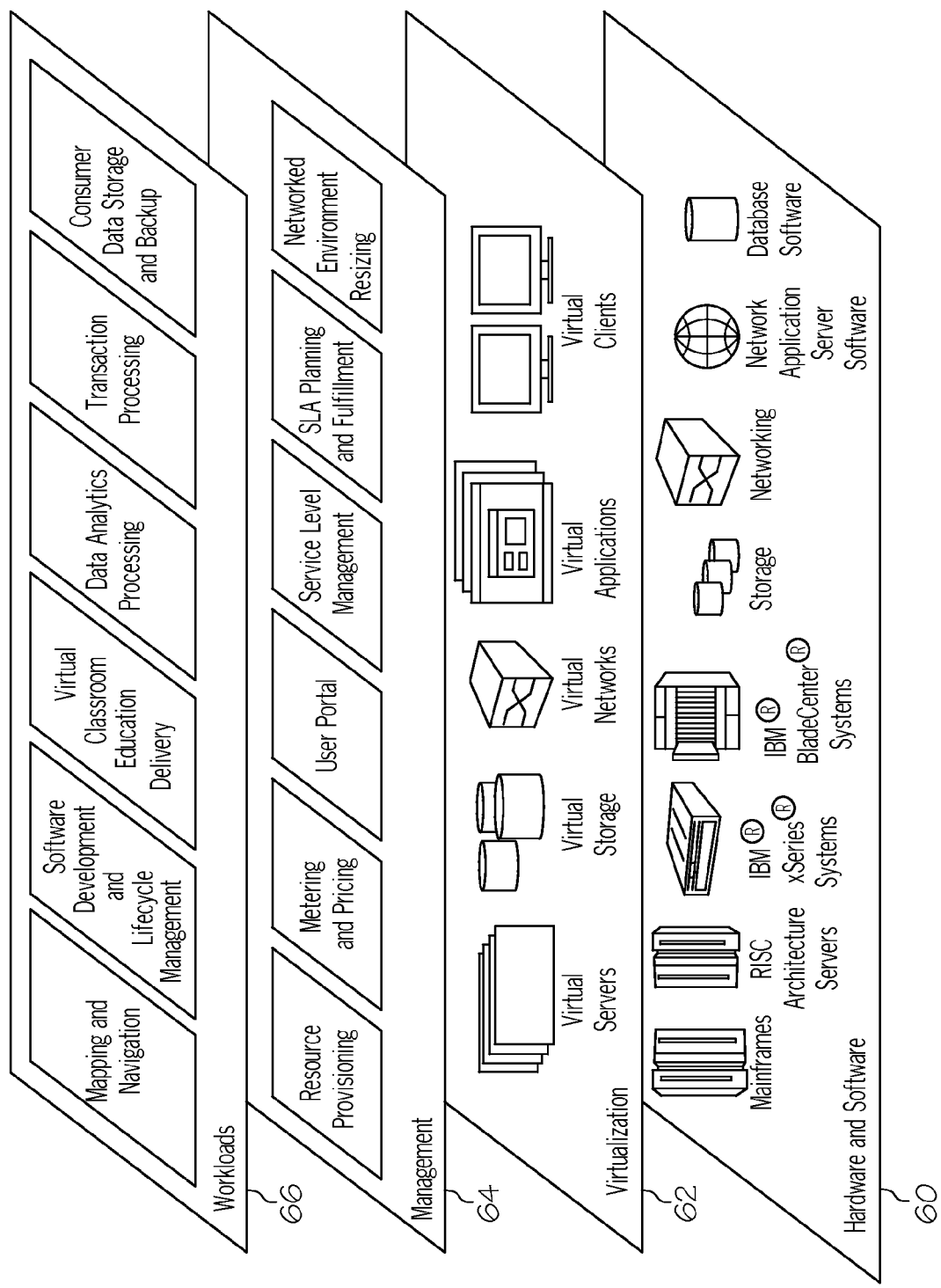
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes. In one example, IBM® zSeries® systems and RISC (Reduced Instruction Set Computer) architecture based servers. In one example, IBM pSeries® systems, IBM xSeries® systems, IBM BladeCenter® systems, storage devices, networks, and networking components. Examples of software components include network application server software. In one example, IBM WebSphere® application server software and database software. In one example, IBM DB2® database software. (IBM, zSeries, pSeries, xSeries, BladeCenter, WebSphere, and DB2 are trademarks of International Business Machines Corporation registered in many jurisdictions worldwide.)

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. Consumer portal provides access to the cloud computing environment for consumers and system administrators. Service level management provides cloud computing resource allocation and management such that required service levels are met. Service Level Agreement (SLA) planning and fulfillment provides pre-arrangement for, and procurement of, cloud computing resources for which a future requirement is anticipated in accordance with an SLA. Further shown in management layer is networked environment resizing, which represents the functionality that is provided under the embodiments of the present invention.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and consumer data storage and backup. As mentioned above, all of the foregoing examples described with respect to FIG. 3 are illustrative only, and the invention is not limited to these examples.

It is understood that all functions of the present invention as described herein typically may be performed by the networked environment resizing functionality (of management layer 64, which can be tangibly embodied as modules of program code 42 of program/utility 40 (FIG. 1). However, this need not be the case. Rather, the functionality recited herein could be carried out/implemented and/or enabled by any of the layers 60-66 shown in FIG. 3.

It is reiterated that although this disclosure includes a detailed description on cloud computing, implementation of the teachings recited herein are not limited to a cloud computing environment. Rather, the embodiments of the present invention are intended to be implemented with any type of networked computing environment now known or later developed.

As indicated above, embodiments of the invention provide methods to determine availability of resources to be used to resize a cloud computing environment. A first method utilizes a centralized configuration management system (also known as configuration management database or CMDB). This CMDB performs asset and infrastructure discovery such that all available resources are stored in the CMDB. Information associated with each resource should include (but not be limited to):

1) current usage—production, development, test;
2) current status—in use, retired, failed;
3) priority of current use—high, medium, low, or other comparable metric;
4) location (data center, rack number, etc.);
5) type of server—UNIX, Intel, etc.; and/or
6) free capacity (Memory, Disk, CPU);

Another method involves the use of a "discovery system" that automatically performs a scan of available resources in a data center or the like to determine which resources are running in the environment and the status of each. In either method, embodiments of the present invention use the information found to build a data structure (e.g., mapping, table, etc.) of 'candidate' resources that may be used to expand the cloud if required. Any resources which are discovered to be 'free' and are being utilized for a lower priority workload are added to the 'candidate' resource list.

Accordingly, embodiments of the present invention determine whether the current networked computing environment can efficiently manage the current and predicted workload for the environment and to signal when it may be necessary to expand the cloud. This algorithm can be implemented through a cloud resource manager system or the like that examines workloads to make a determination as to whether the environment should be expanded or contracted. The algorithm first analyzes current customer usage and the mappings to the current cloud resources. It then references a CMDB or the like to determine whether there are any resources that would be preferential to use within the cloud environment. If such resources are found, a request to have the resource added to the networked environment is made.

Figure 4:
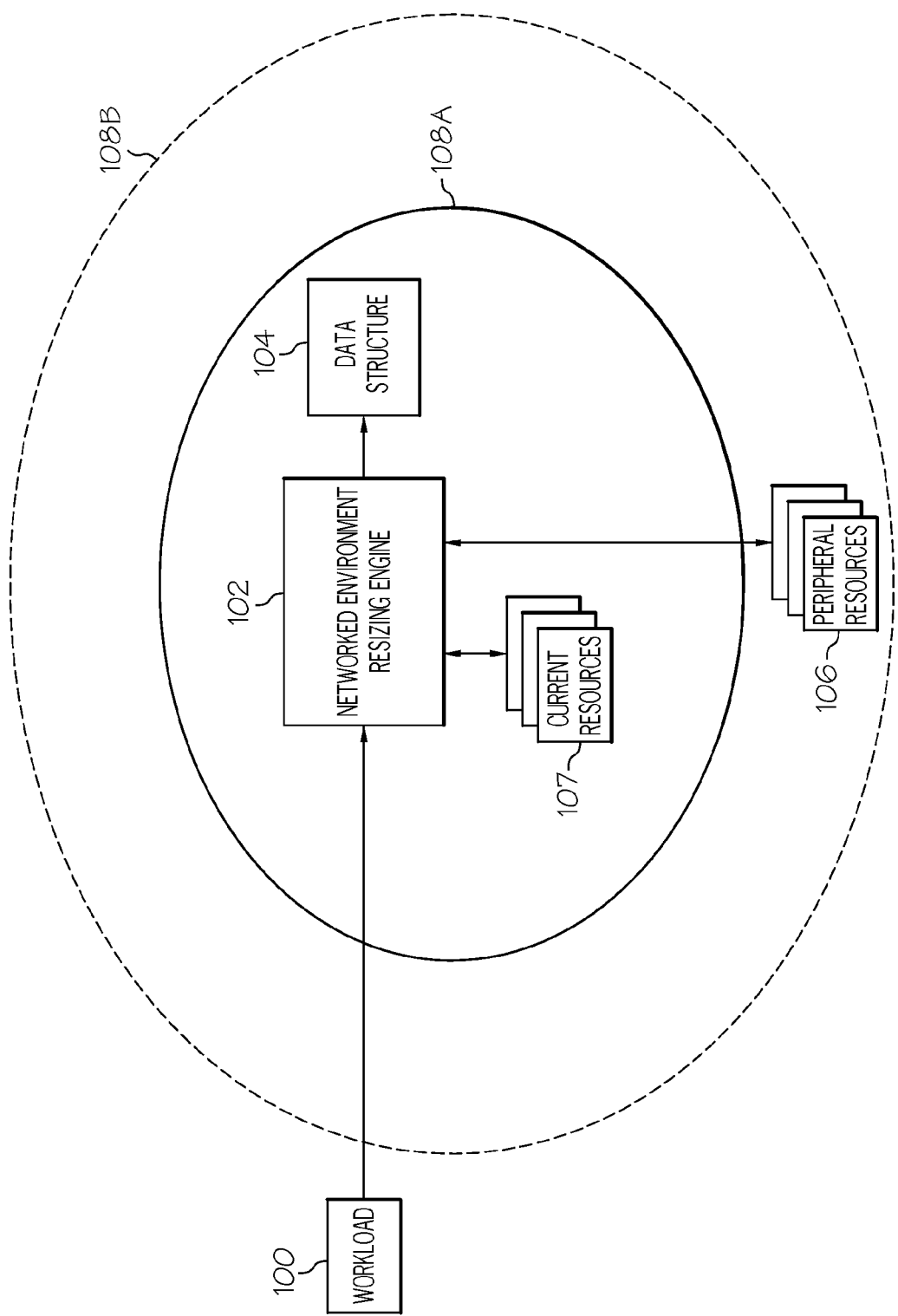
FIG. 4 depicts a system diagram according to an embodiment of the present invention.

Referring now to FIG. 4, a system diagram according to an embodiment of the present invention is shown. As depicted, the system comprises a networked environment resizing engine (engine 102) that is represented as program/utility 40 of FIG. 1 and network resizing function 64 of FIG. 3. It is understood that engine 102 can be incorporated within or work in conjunction with a resource management system/tool. In general, engine 102 will receive a workload 100, and create a data structure 104 (e.g., a mapping) that is populated with data related to a set of current resources 107 of the networked computing environment 108A that are allocated to the workload (and other workloads currently being processed or scheduled to be processed). Engine 102 will then determine if a mismatch (e.g., a shortfall) exists between the set of current resources and resources required for processing the workload. Responsive to the existence of a mismatch, engine 102 will identify a set of peripheral resources 106 (e.g., that comprises the mismatch) to address shortfalls such as potential latency inefficiencies. Thereafter, engine 102 resizes the networked computing environment 108A to yield enlarged networked computing environment 108B to incorporate the set of peripheral resources 106 and then process workload 100 accordingly.

More specifically, engine 102 comprises logic and/or rules capable of implementing the following steps:

Step 1. Analyze current and expected cloud users.

Engine 102 will analyze current and expected networked computing environment users. The system communicates to a portal (or other system that detects which users are currently utilizing the cloud) and stores this information alongside other information including (but not limited to):

the location of the user(s);
the priority of the user(s) (VIP, executive, typical user); and/or
the service levels of the cloud service that is being used.

This information may be stored in a relational database or other format such as extensible markup language (XML).

Step 2. Map usage to current cloud resources.

Engine 102 next maps the current cloud users to the resources within the cloud that they are consuming. This may be done using a cloud scheduler that determines which resources should run which cloud services. This mapping builds a table between users and resources. Other information associated with the resources may also be stored via a CMDB solution including 'cost' of using the resource, 'location' of resources, etc.

Step 3a. Identify potential resource shortfalls.

Using the data structure/mapping created in steps 1 and 2 above, the resource manager looks at the mapping to determine whether there are any resource shortfalls (e.g., any potential upcoming scenarios where a resource may be unavailable). Specifically, engine 102 examines resources currently in the cloud that are 'free for use' (from step 2) and looks at the distribution of customers currently using the cloud to ensure that there are always free resources available. The system also examines the location of the customers to determine whether there is a shortfall in the specific datacenter which may need to be filled. For example, there may be 20 users accessing a web cloud service in Germany but only one web resource available for use in Germany, whereas there may be 100 web resources available in another data center. Optionally engine 102 may integrate into current monitoring systems to determine whether there are any unavailable resources due to an issue or problem. This may flag a shortfall for a specific resource type.

Step 3b. Identify latency inefficiencies.

This step optimizes the distance and data transfer between user and resource. In particular, engine 102 determines if there are any customers that are using the resources remotely where there may be efficiencies to be made using local resources. For example, a customer may be using a network-intensive service using resources in a remote data center. The service would be greatly improved if the resource was made available locally.

Step 3c. Identify 'expensive' resources.

The term 'expensive' may be specific to the networked environment provider in terms of financial or drain of resources. In either case, engine 102 determines whether there are resources that are currently being used that are more expensive than others, including, but not limited to:

Are there resources where the cost to lease is higher than normal?

Are there resources which are putting a drain on the network WAN infrastructure?

Step 4. Create 'Improvement List'.

Engine 102 will then take the items identified in steps 3a-c to make a determination as to which new resources are required or desired in which locations.

Step 5. Cross Reference CMDB to identify resources.

Step 5 takes the resource requirements and maps them to actual available resources. Along these lines, a requirement in the 'improvement list' may be matched to a free resource in the CMDB, and therefore a request may be made to have it provisioned (e.g., using pattern matching). There may be more complex matchings based on: a high priority requirement in the 'improvement list' may take precedence over a resource which is being used for development; and/or an expensive resource being used today may take precedence over a cheaper resource being used for something else. Once this analysis is complete, engine 102 has a list of resources that can be provisioned into the cloud and resources' that may be de-provisioned to be used for something else.

Step 6. Provision of de-provision resources into or out of the cloud.

This final step takes the list in step 5 and automatically provisions a resource into or out of the networked computing environment. As shown in FIG. 4, this may not only result in expansion of environment 108A to yield 108B, but also contraction of an environment to remove underutilized resources.

Figure 5:
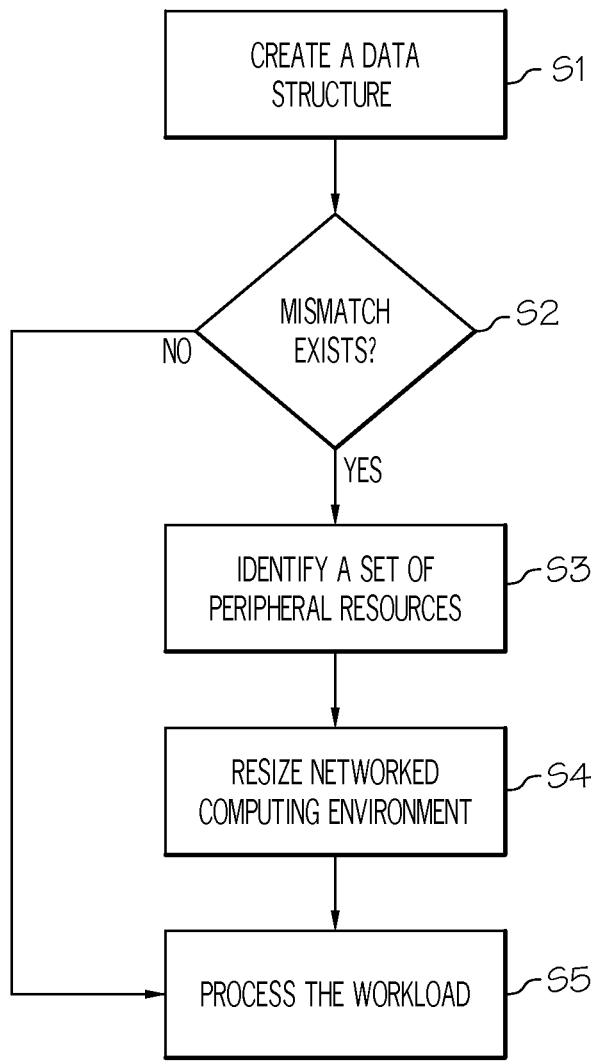
FIG. 5 depicts a method flow diagram according to an embodiment of the present invention.

Referring now to FIG. 5, a method flow diagram according to an embodiment of the present invention is shown. In step S1, a data structure is created on a computer storage device and populated with data related to a set of current resources of the networked computing environment that are allocated to the workload. In step S2, it is determined whether a mismatch exists between the set of current resources and resources required for processing the workload. If not, the workload can be processed in step S5. Conversely, responsive to the existence of a mismatch, a set of peripheral resources is identified in step S3. In general, the set of peripheral resources comprises the mismatch (e.g., to account for any resources shortfall). In step S4, the networked computing environment is resized based upon the identifying. In step S5, the workload is processed using the resized networked computing environment.

While shown and described herein as a networked computing environment resizing solution, it is understood that the invention further provides various alternative embodiments. For example, in one embodiment, the invention provides a computer-readable/useable medium that includes computer program code to enable a computer infrastructure to provide networked computing environment resizing functionality as discussed herein. To this extent, the computer-readable/useable medium includes program code that implements each of the various processes of the invention. It is understood that the terms computer-readable medium or computer-useable medium comprise one or more of any type of physical embodiment of the program code. In particular, the computer-readable/useable medium can comprise program code embodied on one or more portable storage articles of manufacture (e.g., a compact disc, a magnetic disk, a tape, etc.), on one or more data storage portions of a computing device, such as memory 28 (FIG. 1) and/or storage system 34 (FIG. 1) (e.g., a fixed disk, a read-only memory, a random access memory, a cache memory, etc.).

In another embodiment, the invention provides a method that performs the process of the invention on a subscription, advertising, and/or fee basis. That is, a service provider, such as a Solution Integrator, could offer to provide networked computing environment resizing functionality. In this case, the service provider can create, maintain, support, etc., a computer infrastructure, such as computer system 12 (FIG. 1) that performs the processes of the invention for one or more consumers. In return, the service provider can receive payment from the consumer(s) under a subscription and/or fee agreement and/or the service provider can receive payment from the sale of advertising content to one or more third parties.

In still another embodiment, the invention provides a computer-implemented method for networked computing environment resizing. In this case, a computer infrastructure, such as computer system 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system 12 (FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

As used herein, it is understood that the terms "program code" and "computer program code" are synonymous and mean any expression, in any language, code, or notation, of a set of instructions intended to cause a computing device having an information processing capability to perform a particular function either directly or after either or both of the following: (a) conversion to another language, code, or notation; and/or (b) reproduction in a different material form. To this extent, program code can be embodied as one or more of: an application/software program, component software/a library of functions, an operating system, a basic device system/driver for a particular computing device, and the like.

A data processing system suitable for storing and/or executing program code can be provided hereunder and can include at least one processor communicatively coupled, directly or indirectly, to memory elements through a system bus. The memory elements can include, but are not limited to, local memory employed during actual execution of the program code, bulk storage, and cache memories that provide temporary storage of at least some program code in order to reduce the number of times code must be retrieved from bulk storage during execution. Input/output and/or other external devices (including, but not limited to, keyboards, displays, pointing devices, etc.) can be coupled to the system either directly or through intervening device controllers.

Network adapters also may be coupled to the system to enable the data processing system to become coupled to other data processing systems, remote printers, storage devices, and/or the like, through any combination of intervening private or public networks. Illustrative network adapters include, but are not limited to, modems, cable modems, and Ethernet cards.

The foregoing description of various aspects of the invention has been presented for purposes of illustration and description. It is not intended to be exhaustive or to limit the invention to the precise form disclosed and, obviously, many modifications and variations are possible. Such modifications and variations that may be apparent to a person skilled in the art are intended to be included within the scope of the invention as defined by the accompanying claims.

What is claimed is:

1. A computer-implemented method for dynamically resizing a cloud computing environment to optimally accommodate a workload, comprising:
    creating a data structure on a computer storage device and populating the data structure with data related to a set of current resources of the cloud computing environment that are allocated to the workload, the cloud computing environment comprising a defined set of cloud computing resources, the data comprising a location of the set of current resources and a current status of the set of current resources;
    analyzing current users and expected users of the cloud computing environment to determine a location of each of the current users and the expected users;
    determining if a mismatch exists between the set of current resources and resources required for processing the workload based on the location of the set of current resources and the location of each of the current users and the expected users;
    responsive to the existence of a mismatch, identifying, based on a required service level and cost minimization, a set of peripheral resources capable of alleviating the mismatch, the set of peripheral resources being resources initially outside of the defined set of cloud computing resources of the cloud computing environment;
    resizing the cloud computing environment based upon the identification of the set of peripheral resources, the resizing comprising adding the set of peripheral resources to the defined set of cloud computing resources of the cloud computing environment to optimize a distance between the location of each of the current users and the expected users and the set of peripheral resources; and
    processing the workload using the resized cloud computing environment.

2. The computer-implemented method of claim 1, further comprising resizing the networked computing environment to release the set of peripheral resources after the workload has been processed.

3. The computer-implemented method of claim 1, further comprising identifying potential latency inefficiencies occurring in the networked computing environment based on the location of the set of current resources and the location of each of the current and expected users, the set of peripheral resources being further identified to address the potential latency inefficiencies.

4. The computer-implemented method of claim 1, wherein the analyzing step further comprises analyzing the current and expected users of the networked computing environment to determine a priority of each of the current and expected users, and a service level of a cloud service that is being used by each of the current and expected users.

5. The computer-implemented method of claim 4, the workload being at least one of the following: a current workload or an expected workload of the current and expected users.

6. The computer-implemented method of claim 1, the identifying of the set of peripheral resources comprising cross-referencing a database of resources, the database being stored on at least one computer storage device.

7. A system for dynamically resizing a cloud computing environment to optimally accommodate a workload, comprising:
 a bus;
 a processor coupled to the bus; and
 a memory device coupled to the bus, the memory device comprising instructions to:
 create a data structure on a computer storage device and populating the data structure with data related to a set of current resources of the cloud computing environment that are allocated to the workload, the cloud computing environment comprising a defined set of cloud computing resources, the data comprising a location of the set of current resources and a current status of the set of current resources;
 analyze current users and expected users of the cloud computing environment to determine a location of each of the current users and the expected users;
 determine if a mismatch exists between the set of current resources and resources required for processing the workload based on the location of the set of current resources and the location of each of the current users and the expected users;
 responsive to the existence of a mismatch, identify, based on a required service level and cost minimization, a set of peripheral resources capable of alleviating the mismatch, the set of peripheral resources being resources initially outside of the defined set of cloud computing resources of the cloud computing environment;
 resize the cloud computing environment based upon the identification of the set of peripheral resources, the resize comprising adding the set of peripheral resources to the defined set of cloud computing resources of the cloud computing environment to optimize a distance between the location of each of the current users and the expected users and the set of peripheral resources; and
 process the workload using the resized cloud computing environment.

8. The system of claim 7, the memory device further comprising instructions to resize the networked computing environment to release the set of peripheral resources after the workload has been processed.

9. The system of claim 7, the memory device further comprising instructions to identify potential latency inefficiencies occurring in the networked computing environment based on the location of the set of current resources and the location of each of the current and expected users, the set of peripheral resources being further identified to address the potential latency inefficiencies.

10. The system of claim 7, the memory device further comprising instructions to analyze the current and expected users of the networked computing environment to determine a priority of each of the current and expected users, and a service level of a cloud service that is being used by each of the current and expected users.

11. The system of claim 10, the workload being at least one of the following: a current workload or an expected workload of the current and expected users.

12. The system of claim 7, the memory device further comprising instructions to cross-reference a database of resources, the database being stored on at least one computer storage device.

13. A computer program product for dynamically resizing a cloud computing environment to optimally accommodate a workload, the computer program product comprising;
 a memory device, and program instructions stored on the memory device to:
 create a data structure on a computer storage device and populating the data structure with data related to a set of current resources of the cloud computing environment that are allocated to the workload, the cloud computing environment comprising a defined set of cloud computing resources, the data comprising a location of the set of current resources and a current status of the set of current resources;
 analyze current users and expected users of the cloud computing environment to determine a location of each of the current users and the expected users;
 determine if a mismatch exists between the set of current resources and resources required for processing the workload based on the location of the set of current resources and the location of each of the current users and the expected users;
 responsive to the existence of a mismatch, identify, based on a required service level and cost minimization, a set of peripheral resources capable of alleviating the mismatch, the set of peripheral resources being resources initially outside of the defined set of cloud computing resources of the cloud computing environment;
 resize the cloud computing environment based upon the identification of the set of peripheral resources, the resize comprising adding the set of peripheral resources to the defined set of cloud computing resources of the cloud computing environment to optimize a distance between the location of each of the current users and the expected users and the set of peripheral resources; and
 process the workload using the resized cloud computing environment.

14. The computer program product of claim 13, further comprising program instructions stored on the computer readable storage media to resize the networked computing environment to release the set of peripheral resources after the workload has been processed.

15. The computer program product of claim 13, further comprising program instructions stored on the computer readable storage media to identify potential latency inefficiencies occurring in the networked computing environment based on the location of the set of current resources and the location of each of the current and expected users, the set of peripheral resources being further identified to address the potential latency inefficiencies.

16. The computer program product of claim 13, further comprising program instructions stored on the computer readable storage media to analyze the current and expected users of the networked computing environment to determine a priority of each of the current and expected users, and a service level of a cloud service that is being used by each of the current and expected users.

17. The computer program product of claim 16, the workload being at least one of the following: a current workload or an expected workload of the current and expected users.

18. The computer program product of claim 13, further comprising program instructions stored on the computer readable storage media to cross-reference a database of resources, the database being stored on at least one computer storage device.

19. A method for deploying a system for dynamically resizing a cloud computing environment to optimally accommodate a workload, comprising:

providing a computer infrastructure being operable to:

create a data structure on a computer storage device and populating the data structure with data related to a set of current resources of the cloud computing environment that are allocated to the workload, the cloud computing environment comprising a defined set of cloud computing resources, the data comprising a location of the set of current resources and a current status of the set of current resources;

analyze current users and expected users of the cloud computing environment to determine a location of each of the current users and the expected users;

determine if a mismatch exists between the set of current resources and resources required for processing the workload based on the location of the set of current resources and the location of each of the current users and the expected users;

responsive to the existence of a mismatch, identify, based on a required service level and cost minimization, a set of peripheral resources capable of alleviating the mismatch, the set of peripheral resources being resources initially outside of the defined set of cloud computing resources of the cloud computing environment;

resize the cloud computing environment based upon the identification of the set of peripheral resources, the resize comprising adding the set of peripheral resources to the defined set of cloud computing resources of the cloud computing environment to optimize a distance between the location of each of the current users and the expected users and the set of peripheral resources; and process the workload using the resized cloud computing environment.

\* \* \* \* \*